Jan. 14, 1958  F. KESSELRING  2,820,190
ELECTROMAGNETIC RECTIFIER
Filed Aug. 5, 1953
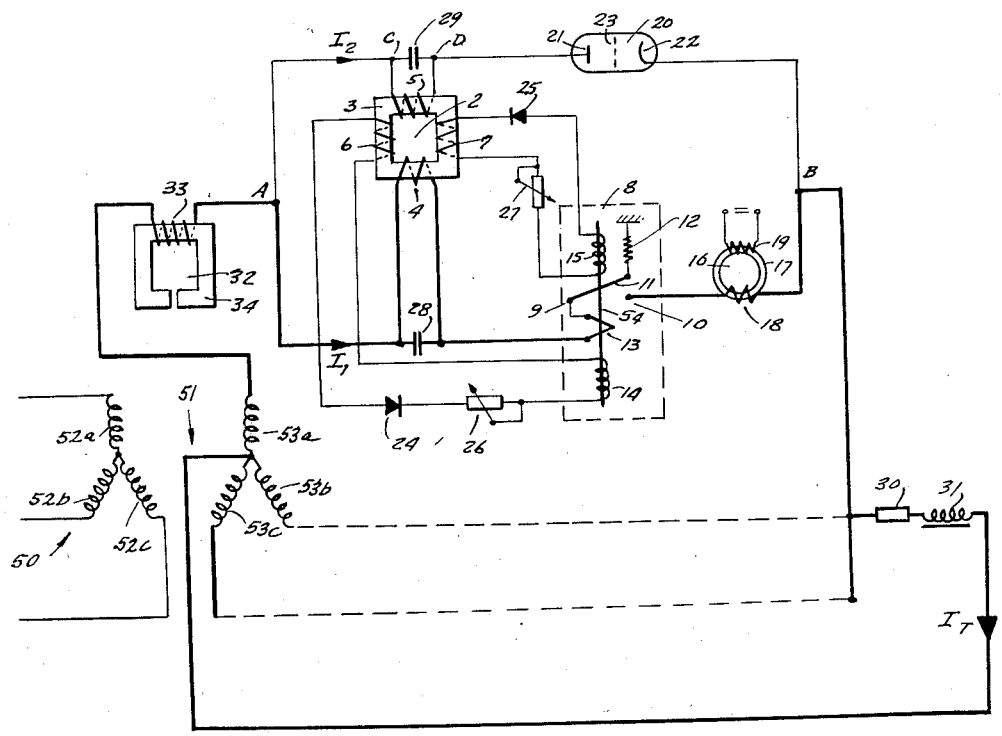
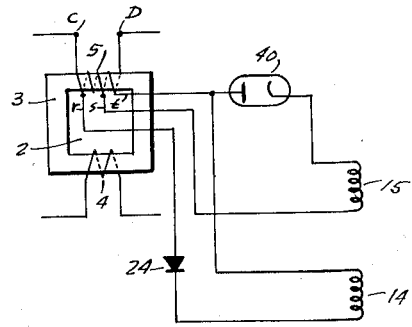
INVENTOR.
FRITZ KESSELRING
BY
ATTORNEYS

United States Patent Office 2,820,190
Patented Jan. 14, 1958

2,820,190

ELECTROMAGNETIC RECTIFIER

Fritz Kesselring, Zollikon, Zurich, Switzerland, assignor to FKG Fritz Kesselring Geratebau A. G., Bachtobel-Weinfelden, Thurgau, Switzerland, a corporation of Switzerland Application August 5, 1953, Serial No. 372,455

9 Claims. (Cl. 321—48)

My invention relates to an electromagnetic rectifier and is more particularly directed to a novel circuitry having a voltage and current path.

My instant invention is an improvement over the circuitry disclosed in my copending applications Ser. No. 343,077, filed March 18, 1953, now Patent No. 2,782,345; Ser. No. 343,078, filed March 18, 1953, now Patent No. 2,744,931; and Ser. No. 343,079, filed March 18, 1953.

The circuit arrangement of my invention comprises a voltage and current path which are coupled together by means of a transformer.

An electromagnetically operated switch, which is inserted in series with the current path, is provided with an opening winding, a closing winding and a holding winding. The transformer couples the voltage circuit to the current circuit. The transformer is provided with a primary winding, a closing secondary winding and a holding secondary winding. The opening secondary winding and the closing secondary winding, respectively, of the transformer are connected to the closing and opening windings of the electromagnetic switch.

During the period of time when the current is increasing from zero, the cooperating contacts of the electromagnetic switch are open and hence, no current will flow through the current path. However, a tube connected in series with the voltage path will break down and permit current to flow through this voltage path. At this time, the secondary winding of the transformer will be energized and induce a voltage both the holding secondary winding and closing secondary winding. However, the polarity of the induced voltage in the opening secondary winding will be opposite to the forward direction of the dry rectifier electromagnetically connected in this circuit and hence, the opening winding will not be energized at this time. However, the induced voltage in the closing secondary winding will be of proper polarity to permit conduction through the second rectifier electrically connected in the closing winding circuit. Hence, the closing winding of the electromagnetic switch will be energized to move the cooperating contacts thereof into engagement.

During the latter portion of the conducting cycle when the current is approaching zero, a reverse condition will exist and the dry rectifier in the closing circuit will be of a polarity to prevent current flow therein. However, the dry rectifier in the opening winding circuit will be of proper polarity with respect to the induced voltage in the opening secondary winding to permit current to flow therein thereby enabling opening of the electromagnetic switch.

In a modified arrangement of my invention, an autotransformer principle is used on the coupling transformer wherein the opening secondary winding and the closing secondary winding are tapped from the main secondary winding of the transformer.

Accordingly, a primary object of my invention is to provide a novel electromagnetically operated rectifier wherein a coupling transformer between a voltage and current circuit will be instrumental in providing energization for both the opening and closing of an electromagnetically operated switch.

Another object of my invention is to provide a coupling transformer between the voltage and current path which is electrically connected to an electromagnetically operated switch in such a manner that only the closing winding is energized during the initial portion of the conducting cycle and only the opening winding is energized during the latter portion of the conducting cycle.

Still another object of my invention is to provide a novel rectifier circuit in which a coupling transformer between the current path and the voltage path is provided with a main winding, a secondary winding, an opening winding and a closing winding which are electrically connected to the circuitry to provide proper control of an electromagnetic switch for opening and closing the cooperating contacts thereof.

A still further object of my invention is to provide a coupling transformer between a voltage and current path wherein the opening and closing secondary windings are tapped from the main secondary winding thereof to provide control of the cooperating contacts of an electromagnetically operated switch.

These and other objects of my invention will be apparent from the following description when taken in connection with the drawings in which:

Figure 1 is a schematic wire diagram of my invention illustrating the voltage and current parallel circuits which enable the use of a small commutating reactor. This figure illustrates the circuitry used with one phase of a three phase rectifier with the other two phases indicated by the dotted line.

Figure 2 is a partial schematic wiring diagram showing a first modification of the transformer used in my invention.

The rectifier of my invention is used to transform the A.-C. voltage from source 50 to supply direct current to the load 30. The source 50 feeds the three phase transformer 51 having primary windings 52a, 52b and 52c. The secondary windings of transformer 51 are indicated by the numerals 53a, 53b and 53c.

As will be noted, the circuitry for phase a is indicated in Figure 1 and for the sake of clarity, the circuitry for phases b and c is shown by the dotted line. However, it will be apparent to those skilled in the art that the parallel circuit control means for phases b and c will be identical to that described in connection with phase a.

The transformer 2 is provided with an iron core 3 having a primary winding 4, a main secondary winding 5, a closing secondary winding 6 and an opening secondary winding 7. The main secondary winding 5 is connected to the voltage path, in which current $I_2$ flows, and has a condenser 29 shunted across the terminals thereof.

A tube 20 is connected in series with the voltage path and may be a triode as illustrated. The tube 20 has a plate 21 which is connected to the source side of the circuit and a cathode 22 connected to the load side of the circuit.

The current path through which current $I_1$ flows is connected in parallel at points A and B with the voltage path described above. The current path is comprised of the saturable reactor 16 connected in series with the normally open electromagnetic switch 8. The saturable reactor 16 has a main current winding 18 wound on the magnetic core 17 and a biasing or pre-excitation winding 19.

The electromagnetic switch is comprised of stationary contact 10 with which the movable contact 11 cooperates. The movable contact 11 is pivoted at point 9 and is biased to disengaged position by means of the bias spring 12. The movable contact 11 is physically connected to the armature 54. The electromagnetic switch 8 has three windings which control the position of the armature 54.

The current carrying holding winding 13 is connected in series with the current path and is energized only after the armature or moving contact 11 is brought into engagement with the stationary contact 10.

The closing winding 14 is instrumental in moving the movable contact 11 from the disengaged position to the engaged position when sufficiently energized and the opening winding 15 will effect disengagement of the cooperating contacts when it is sufficiently energized. The closing winding 14 is connected in series with the closing secondary winding 6 of the transformer 2 through the dry rectifier 26.

The opening winding 15 is connected in series with the opening secondary winding 7 of the transformer 2 through the dry rectifier 25 and the variable resistor 27.

As will hereinafter be more fully explained, the dry rectifiers 24 and 25 are respectively poled so that the closing winding 14 and the opening winding 15 are only energized at a predetermined point of the conducting cycle.

The primary winding 4 of the transformer 2 is connected in series with the current branch of the circuit and has a capacitor 28 shunted across the terminals thereof.

It will be noted that a smoothing choke 31 is connected on the load side of the parallel combination of the voltage and current path and a choke coil 32 is connected on the input side of this parallel combination. The choke coil 32 has an iron core 34 and a main winding 33.

The operation of the circuit is as follows: When the voltage induced in the supply secondary winding 53a by the primary winding 52a sufficiently exceeds the voltage across the load 30 so that the tube 20 breaks down, a current will begin to flow through the following circuit—from secondary winding 53a to the main winding 33 of the choke 32 to point A, through main secondary winding 5 of transformer 2, through tube 20 to point B, through load 30, smoothing choke 31 and back to the secondary winding 53a.

It will be noted that at this time, no current flows through the current path since the cooperating contacts 10 and 11 are in disengaged position. Thus, the only current flowing in the parallel path combination is the current $I_2$ which is now flowing through the voltage path. This current $I_2$ will energize the iron core 3 of the transformer 2 to thereby induce a voltage in the closing secondary winding 6, the primary winding 4 and the opening secondary winding 7.

However, it will be noted that no current will flow in the circuit connected to the opening secondary winding 7 due to the fact that the dry rectifier 25 is poled in a direction opposite to that of the voltage induced in the winding 7. Hence, the opening coil 15 will not be energized. Also, the voltage induced in the primary winding 4 will have no effect in view of the fact that this winding is connected to an open circuit created by the disengaged contacts 10 and 11. However, the voltage induced in the closing secondary winding 6 will be permitted to flow in a circuitry connected thereto in view of the fact that the dry rectifier 24 is poled in a direction to permit current flow therethrough.

By proper adjustment of the rheostat 26, the magnitude of the current energizing the closing winding 14 can be adjusted so that it is sufficiently energized to attract the armature 54 at a predetermined time in the cycle.

It will be noted that the impedance of the circuit connected to the closing secondary winding 6 will be reflected to the secondary winding 5 which is now acting as a primary winding. This impedance will appear across the capacitor 29. However, it will be noted that the various components of the circuit are so designed that the voltage drop across the capacitor 29 is small compared with the voltage drop of the remaining portions of the circuit.

As above noted, when the current in the closing winding 14 reaches a predetermined closing value, it will attract the armature 54, the electromagnetic switch 8, thereby moving the movable contact 11 into engagement with the stationary contact 10 thereby closing the current path. It will be noted that these cooperating contacts 10 and 11 close in substantially currentless conditions due to the fact that the induced voltage in the primary winding 4 will be in a direction to oppose the initial flow of the current $I_1$ in the current path. Furthermore, the main winding 18 of the commutating reactor 17 will be in series with the cooperating contacts 10 and 11 to thereby prevent the instantaneous rise of the current. It will also be noted that since the shunt voltage path through the tube 20 is provided, there will be no instantaneous rise of the current in the current path thereby avoiding damage to the cooperating contacts 10 and 11.

Since the current $I_1$ will have to magnetize the core 17 of the saturable reactor 16 in a reverse direction, a step current will be created to provide safe closing for the contacts 10 and 11.

After a predetermined time, when the core 16 becomes saturated, the step period will end and the main current $I_1$ flowing in the current path will begin to flow, thereby energizing the main holding winding 13 of the electromagnetic switch 8.

When the normal load current flows through the holding winding 13, the movable contact 11 will be held in high pressure engagement with the cooperating contact 10.

It will be noted that the current $I_1$ now flowing in the primary winding 4 will induce a voltage in the secondary winding 5 which is opposite to that which will be biased to the voltage in this winding which existed when only current $I_1$ was flowing in the circuit. That is, the voltage induced in the secondary winding 5 will now be in a direction opposite to that which existed prior to the engagement of the cooperating contacts 10 and 11. Hence, the current $I_2$ will go to zero directly removing the plate voltage from the tube 20 and cause this tube to stop conducting. At this point in the conducting cycle, the current $I_1$ in the current path will be equal to the total current $I_t$ which is flowing through the load 30 of the smoothing choke 31.

Immediately following the above described sequence, the current $I_1$ will reach the maximum value of the D.-C. current flowing through the load 30 and the smoothing choke 31. At this time, there will be no change in the flux in the core 3 of the transformer 2. Hence, there will be no voltage induced in the secondary winding 5 and this state of condition will continue until the make step for phase $b$. After the total current $I_1$ has reached its maximum value, it will commence to decrease in magnitude since the current $I_1$ in the current path is equal to $I_t$. At this time, there will be a decrease in the current flowing in the main primary winding 4 of the transformer 2. Thus, the flux in the core 3 will now be reversed and a voltage will be induced in the secondary winding 5 in a direction opposite to that induced during the make step of the saturable reactor 16.

The induced voltage in the secondary winding 5 will be of proper polarity to cause the break down of the tube 20 thereby resulting in conduction through this tube.

It will also be noted that the voltage induced in the opening secondary winding 7 of the transformer 2 will now be of proper polarity to break down the dry rectifier 25 thereby providing a source and circuitry for the energization of the opening winding 15. Thus, it will be noted that the opening winding 15 is energized as a result of decreasing current energizing the core 3 of transformer 2 and the circuit is so designed that this opening coil 15 is only energized after the tube 20 breaks down.

It will also be noted that the circuit components are preferably designed so that the saturable reactor 16 becomes unsaturated and commences the break step immediately prior to the full energization of the opening winding 15.

As was heretofore noted, the dry rectifiers 24 and 25 are respectively poled in opposite directions. Hence, even though the decreasing current flow through main primary winding 4 induces a voltage in both the closing secondary winding 6 and the opening secondary winding 7, there will be no current flow in the circuitry connected to this former winding due to the poling of the dry rectifier 24.

The parallel voltage and current paths between points A and B are designed so that during the period of time above described, the current $I_1$ will decrease at a faster rate than the decrease of the total of current $I_t$.

A short time before the current $I_1$ goes to zero, the saturable reactor 16 will become unsaturated thereby creating a break step in the current.

At the time that the current $I_1$ goes to zero, the holding coil 13 will no longer be energized. Only $I_2$ will be flowing in the parallel circuit arrangement and will be decreasing at the instant that the current $I_1$ reaches the zero magnitude.

As above described, a voltage of proper polarity will be induced in the opening secondary winding 7 so that the cooperating contacts 10 and 11 of the electromagnetic switch 8 will disengage at current zero.

The voltage drop across the capacitor 29 at points C and D is the result of the reflected impedance multiplied by the decrease in current $I_2$. It will be noted that the reflected impedance from the opening circuitry 7—15 is reduced by the turns ratio of the opening secondary winding 7 and the secondary winding 5.

The voltage appearing across capacitor 29 at points C and D is small compared with the voltage drop in the current or commutation circuit.

At the time that the current $I_2$ in the voltage branch reaches a zero value, the tube 20 stops conducting thereby completing the opening operation.

The circuitry described in connection with Figure 1 has the advantages of being able to provide a saturable reactor 16 which is much smaller, much more economical than the saturable reactor used in the conventional type of electromagnetic rectifiers.

In the prior art arrangements, the price of the large saturable reactor represents approximately 70 to 80 percent of the price of the entire electromagnetic rectifier and, therefore, it is apparent that a great saving can be achieved with my novel circuit. That is, by providing a parallel circuit arrangement so that current can be diverted from the current path of the saturable reactor during the make and break of the electromagnetic switch 8, it is possible to make this component relatively small.

Moreover, the small induced voltage drop in the main winding 18 of the saturable reactor when it is in a saturated condition improves the power factor of the circuit and the absence of the resistance lost in this winding greatly improves the efficiency of the circuit so that artificial cooling is no longer necessary.

It will be noted that the saturable reactor 16 is preferably provided with a pre-excitation winding 19 which may be energized from a stabilized D.-C. current so as to insure a sufficiently small value of make step and break step current through the main reactor winding 18 when the core 17 is saturated.

In the arrangement of Figure 1, I have provided a choke coil 32 in series with the parallel combination of the current and voltage path. The saturable choke 32 is inserted to provide proper protection for the rectifier due to the short period of the make and break step of the commutating reactor 16. The choke coil 32 is designed so as to have an inductance which is at least near to the inductance of the current or commutating circuit when small magnitudes of current flow through its main winding 33. However, at larger values of current, the core 34 of the choke 32 will saturate and hence, the inductions due to the saturation of the iron core will become extremely small. Accordingly, it is possible with this arrangement to keep the time of short circuit constant for a large current range.

A modified arrangement of Figure 2 shows the use of an auto-transformer secondary winding for the transformer 2 to replace the independent secondary winding 5, closing secondary winding 6 and opening secondary winding 7. In this simplified arrangement, the components which are similar to those of Figure 1 are noted by the similar numerals.

In the circuitry of Figure 2, the winding 5 exists between the points R and T and the closing coil winding is tapped from the secondary winding 5 between the points R and S. It will be noted that the circuitry for the closing winding 14 contains a dry rectifier 24 and operates in substantially the same manner as set forth in connection with Figure 1.

The opening secondary winding, comparable to winding 7 of Figure 1, is tapped from the secondary winding 5 between the terminals S and T to provide an energizing source for the opening winding 15.

In order to provide protection so that the opening winding 15 will not be energized before the firing of the tube 20 thereby preventing an untimely opening of the electromagnetic switch 8, a tube 40 is inserted in the circuit to replace the dry rectifier of Figure 1. Tube 40 is so designed that it will not break down until after the tube 20 starts to conduct.

Thus, in the modified arrangement of Figure 2, the secondary winding 5 is designed as an auto-transformer from which the opening secondary winding and closing secondary winding are tapped. Thus, the winding 6 and 7 of Figure 1 can be eliminated.

It will be noted that the electromagnetic switch 8 can be designed with a magnetic structure so that the movable contact 11 will be maintained in the off position by means of residual magnetism after it has been moved by the opening coil 15.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In an electromagnetic rectifier having a current path and a voltage path connected in parallel; said parallel combination connected in series between an alternating current source and a load; a transformer coupling said current circuit to said voltage circuit; an electromagnetic switch having a closing winding, a holding winding and an opening winding; said closing winding and said opening winding of said electromagnetic switch electrically connected to said transformer and energized therefrom; said holding winding connected in series with said current circuit; said closing winding energized at a period of time when the current through said current circuit is zero; a choke connected in series with said parallel current and voltage path; said choke coil having a saturated iron core; said core saturated during the period of time when said electromagnetic switch is moved from said engaged to disengaged position and when moved from disengaged to engaged position; a tube connected in series with said voltage circuit; said tube energized before the energization of said opening winding from said transformer.

2. In an electromagnetic rectifier comprising a voltage path and a current path; said voltage and current path connected in parallel; said parallel combination connected in series with an alternating current source and a direct current load; a transformer comprising a primary winding, a secondary winding, a closing secondary winding and an opening secondary winding; an electromagnetic switch having a pair of cooperating contacts controlled by an opening winding, a closing winding and a holding winding; said primary winding of said transformer and said holding winding of said electromagnetic switch connected in series in said current path; said secondary winding of said transformer connected in series with said voltage path; said said closing secondary winding of said transformer electrically connected to said closing winding of said electromagnetic switch; said opening secondary winding of said transformer electrically connected to said opening winding of said electromagnetic switch; a first means to prevent the energization of said opening winding by said opening secondary winding when the current of said rectifier is increasing; a second means to prevent the energization of said closing winding by said closing secondary winding when the current in said rectifier is decreasing.

3. In an electromagnetic rectifier comprising a voltage path and a current path; said voltage and current path connected in parallel; said parallel combination connected in series with an alternating current source and a direct current load; a transformer comprising a primary winding, a secondary winding, a closing secondary winding and an opening secondary winding; an electromagnetic switch having a pair of cooperating contacts controlled by an opening winding, a closing winding and a holding winding; said primary winding of said transformer and said holding winding of said electromagnetic switch connected in series in said current path; said secondary winding of said transformer connected in series with said voltage path; said closing secondary winding of said transformer electrically connected to said closing winding of said electromagnetic switch; said opening secondary winding of said transformer electrically connected to said opening winding of said electromagnetic switch; a first means to prevent energization of said opening winding by said opening secondary winding when the current of said rectifier is increasing; a second means to prevent the energization of said closing winding by said closing secondary winding when the current in said rectifier is decreasing; a tube connected in series with said voltage path; said first means preventing energization of said opening winding by said opening secondary winding before the conduction of said tube.

4. In an electromagnetic rectifier comprising a voltage path and a current path; said voltage and current path connected in parallel; said parallel combination connected in series with an alternating current source and a direct current load; a transformer comprising a primary winding, a secondary winding, a closing secondary winding and an opening secondary winding; an electromagnetic switch having a pair of cooperating contacts controlled by an opening winding, a closing winding and a holding winding; said primary winding of said transformer and said holding winding of said electromagetic switch connected in series in said current path; said secondary winding of said transformer connected in series with said voltage path; said closing secondary winding of said transformer electrically connected to said closing winding of said electromagnetic switch; said opening secondary winding of said transformer electrically connected to said opening winding of said electromagnetic switch; a first means to prevent the energization of said opening winding by said opening secondary winding when the current of said rectifier is increasing; a second means to prevent the energization of said closing winding by said closing secondary winding when the current in said rectifier is decreasing; said voltage and current parallel path connected in series with a choke coil; said choke coil having an iron core; said choke coil having a high inductance when the current in said rectifier circuit is small; said choke coil having a low inductance when the current in said rectifier circuit is large.

5. In an electromagnetic rectifier comprising a voltage path and a current path; said voltage and current path connected in parallel; said parallel combination connected in series with an alternating current source and a direct current load; a transformer comprising a primary winding, a secondary winding, a closing secondary winding and an opening secondary winding; an electromagnetic switch having a pair of cooperating contacts controlled by an opening winding, a closing winding and a holding winding; said primary winding of said transformer and said holding winding of said electromagnetic switch connected in series in said current path; said secondary winding of said transformer connected in series with said voltage path; said closing secondary winding of said transformer electrically connected to said closing winding of said electromagnetic switch; said opening secondary winding of said transformer electrically connected to said opening winding of said electromagnetic switch; a first means to prevent the energization of said opening winding by said opening secondary winding when the current of said rectifier is increasing; a second means to prevent the energization of said closing winding by said closing secondary winding when the current in said rectifier is decreasing; a saturable core reactor having a main winding and a preexcitation winding; said main winding of said saturable reactor connected in series with said current path; said saturable reactor providing a make step current and a break step current for said cooperating contacts of said electromagnetic switch.

6. In an electromagnetic rectifier comprising a voltage path and a current path; said voltage and current path connected in parallel; said parallel combination connected in series with an alternating current source and a direct current load; a transformer comprising a primary winding, a secondary winding, a closing secondary winding and an opening secondary winding; an electromagnetic switch having a pair of cooperating contacts controlled by an opening winding, a closing winding and a holding winding; said primary winding of said transformer and said holding winding of said electromagnetic switch connected in series in said current path; said secondary winding of said transformer connected in series with said voltage path; said closing secondary winding of said transformer electrically connected to said closing winding of said electromagnetic switch; said opening secondary winding of said transformer electrically connected to said opening winding of said electromagnetic switch; a first means to prevent the energization of said opening winding by said opening secondary winding when the current of said rectifier is increasing; a second means to prevent the energization of said closing winding by said closing secondary winding when the current in said rectifier is decreasing; a tube connected in series with said voltage path; said first means preventing energization of said opening winding by said opening secondary winding before the conduction of said tube; said voltage and current parallel path connected in series with a choke coil; said choke coil having an iron core; said choke coil having a high inductance when the current in said rectifier circuit is small; said choke coil having a low inductance when the current in said rectifier circuit is large.

7. In a electromagnetic rectifier comprising a voltage path and a current path; said voltage and current path connected in parallel; said parallel combination connected in series with an alternating current source and a direct current load; a transformer comprising a primary winding, a secondary winding, a closing secondary winding and an opening secondary winding; an electromagnetic switch having a pair of cooperating contacts controlled by an opening winding, a closing winding and a holding winding; said primary winding of said transformer and said holding winding of said electromagnetic switch connected in series in said current path; said secondary winding of said transformer connected in series with said voltage path; said closing secondary winding of said transformer electrically connected to said closing winding of said electromagnetic switch; said opening secondary winding of said transformer electrically connected to said opening winding of said electromagnetic switch; a first means to prevent the energization of said opening winding by said opening secondary winding when the current of said rectifier is increasing; a second means to prevent the energization of said closing winding by said closing secondary winding when the current in said rectifier is decreasing; a tube connected in series with said voltage path; said first means preventing energization of said opening winding by said opening secondary winding before the conduction of said tube; said voltage and current parallel path connected in series with a choke coil; said choke coil having an iron core; said choke coil having a high inductance when the current in said rectifier circuit is small; said choke coil having a low inductance when the current in said rectifier circuit is large; a saturable core reactor having a main winding and a pre-excitation winding; said main winding of said saturable reactor connected in series with said current path; said saturable reactor providing a make step current and a break step current for said cooperating contacts of said electromagnetic switch.

8. In an electromagnetic rectifier comprising a voltage path and a current path; said voltage and current path connected in parallel; said parallel combination connected in series with an alternating current source and a direct current load; a transformer comprising a primary winding, a secondary winding, a closing secondary winding and an opening secondary winding; an electromagnetic switch having a pair of cooperating contacts controlled by an opening winding, a closing winding and a holding winding; said primary winding of said transformer and said holding winding of said electromagnetic switch connected in series in said current path; said secondary winding of said transformer connected in series with said voltage path; said closing secondary winding of said transformer electrically connected to said closing winding of said electromagnetic switch; said opening secondary winding of said transformer electrically connected to said opening winding of said electromagnetic switch; a first means to prevent the energization of said opening winding by said opening secondary winding when the current of said rectifier is increasing; a second means to prevent the energization of said closing winding by said closing secondary winding when the current in said rectifier is decreasing; said opening secondary winding and said closing secondary winding being an integral part of said secondary winding.

9. In an electromagnetic switch having a current path and a voltage path connected in parallel; said parallel combination connected in series between an alternating current source and a direct current load; a transformer having a primary winding and a secondary winding; said primary winding connected to said current path; said secondary winding connected to said voltage path; said secondary winding being an auto-transformer with tapped connections to form an opening secondary winding and a closing secondary winding; an electromagnetic switch connected in series with said current path; said opening winding portion of said secondary winding and said closing winding portion of said secondary winding electrically connected to said electromagnetically operated switch to respectively open and close the cooperating contacts of said electromagnetically operated switch.

References Cited in the file of this patent

UNITED STATES PATENTS

| | | |
|---|---|---|
| 2,502,932 | Diebold | Apr. 4, 1950 |
| 2,619,628 | Kesselring | Nov. 25, 1952 |
| 2,691,128 | Wegener | Oct. 5, 1954 |

FOREIGN PATENTS

| | | |
|---|---|---|
| 113,439 | Sweden | Mar. 13, 1945 |
| 870,447 | Germany | Mar. 12, 1953 |
| 883,466 | Germany | July 16, 1953 |